United States Patent

[11] 3,624,659

| [72] | Inventors | Thomas O. Paine<br>Administrator of the National Aeronautics and Space Administration with respect to an invention of;<br>Earle R. Bunker, Jr., Los Angeles, Calif. |
|---|---|---|
| [21] | Appl. No. | 883,524 |
| [22] | Filed | Dec. 9, 1969 |
| [45] | Patented | Nov. 30, 1971 |

[54] AUTOMATED EQUIPOTENTIAL PLOTTER
6 Claims, 4 Drawing Figs.

[52] U.S. Cl. .................................................. 346/1,
318/576, 324/71 R, 346/29
[51] Int. Cl. ........................................... G01d 9/40,
G01r 13/08
[50] Field of Search ............................................. 346/29, 33,
1; 324/113, 29, 71 R; 235/61.6 A, 61.6 B, 184;
318/576

[56] References Cited
UNITED STATES PATENTS

| 2,542,478 | 2/1951 | Clark | 324/71 |
| 2,542,490 | 2/1951 | Ehrenfried | 324/29 |
| 2,612,627 | 9/1952 | Straney | 318/576 |
| 3,038,656 | 6/1962 | Horwitz et al. | 235/61.6 |
| 3,019,072 | 1/1962 | Bose et al. | 346/29 |
| 3,283,134 | 11/1966 | Shaver | 235/184 |

Primary Examiner—Joseph W. Hartary
Attorneys—J. H. Warden, Paul F. McCaul and G. T. McCoy ABSTRACT: Apparatus for automatically drawing equipotential lines on a sheet of resistance paper, that has areas connected to different voltages of a voltage supply. An ordinary X-Y-plotter is used, but the ink pen is insulated from its surroundings, and a wire is connected from the pen to the terminal where the slide wire is normally connected. The plotter is set for automatic X-Sweep, and a preset voltage equal to that of the equipotential line to be drawn, is connected to the Y-input of the plotter. As a result, the difference between the voltage at the pen and the preset voltage drives the pen up or down, so that it always contacts points on the resistance paper which are of the voltage of the equipotential line to be drawn.

PATENTED NOV 30 1971 3,624,659

INVENTOR.
EARLE R. BUNKER, JR.
BY Paul F. McCaul
G. H. McCoy
ATTORNEYS

3,624,659

AUTOMATED EQUIPOTENTIAL PLOTTER

ORIGIN OF THE INVENTION

The invention described herein was made in the performance of work under a NASA contract and is subject to the provisions of Section 305 of the National Aeronautics and Space Act of 1958, Public Law 85–568 (72 stat. 435; 42 USC 2457).

BACKGROUND OF THE INVENTION

1. Field of the Invention

This invention relates to methods and apparatus for potential plotting.

2. Description of the Prior Art

In many applications, it is necessary to determine the precise nature of a field with irregular boundaries of known potential. For example, it may be necessary to design apparatus with high-voltage electrodes that are closely spaced. The electrodes may have to be designed so as to prevent or assure a predetermined field intensity, to prevent breakdown or assure breakdown, respectively, of material between the electrodes. If the electrodes are not of regular geometry, the field intensities cannot be readily calculated even with the aid of sophisticated computers, and analogs are often constructed to aid in plotting the field.

In many situations, two-dimensional representations of the field can be utilized to determine field intensities, as where the electrode configurations do not vary in one dimension, or where the configuration is uniform about one imaginary axis of rotation. In such cases, an analog can be constructed by utilizing a sheet of resistance paper. Areas on the paper of the same shape as the electrodes to be represented are painted on the paper with conductive paint, and proportional voltages are connected to the electrodes. A technician then uses a probe to find points on the paper which are of a particular potential which is in-between the potentials of the electrodes. The technician repeatedly moves his probe on the paper to find points as he goes along. He then draws a line that connects the points, to create an equipotential line of the desired potential. By repeating this process for many potentials, the technician maps the potential field. By viewing such a field, the technician can determine the field intensities at various regions of the field. While this method is very useful, the plotting of many points is very tedious and time consuming, particularly where repeated changes in the electrode configurations must be made to achieve a desired field configuration.

OBJECTS AND SUMMARY OF THE INVENTION

An object of the present invention is to provide a method and apparatus for automatically drawing equipotential lines.

Another object is to provide a method for easily altering an ordinary X-Y-plotter to draw equipotential lines on a sheet of resistance paper.

In accordance with one embodiment of the invention, an ordinary X-Y-plotter is altered to enable it to draw equipotential lines on a sheet of resistance paper. The plotter is altered so that the drawing pen is driven in a Y-direction in accordance with the voltage existing at the point on the resistance paper which is contacted by the pen. The pen is driven in a direction to reduce the difference between its voltage and a preset voltage. Accordingly, the pen remains on an equipotential line with a potential equal to the preset voltage, as it is automatically swept in the X-direction.

The pen is insulated from the rest of the plotter by using bearings of an insulating material to support the pen mount on the pen carriage. A wire is added which has one end connected to the pen mount and another end connected to a summing junction of the plotter, whose output energizes the Y-drive motor. This wire is substituted for the slide wire connection which is normally connected to the summing junction. A preset voltage equal to the potential of the equipotential line to be drawn, is connected to the Y-input terminal of the plotter, so that this voltage is also delivered to the summing junction. Thus, the summing junction provides an output equal to the difference between the voltage of the desired equipotential line and the voltage at the point where the pen contacts the resistance paper. Accordingly, the pen is driven in a Y-direction until this difference voltage is zero, so that it always remains on that equipotential line.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
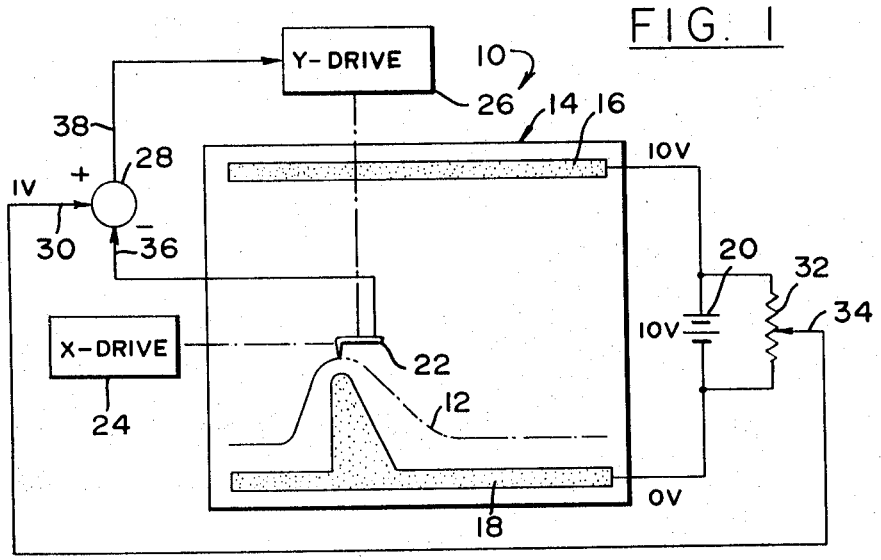
FIG. 1 is a diagrammatic view of a plotter constructed in accordance with the present invention.

The figures show a plotter 10 which has been set up to draw an equipotential line 12 on a sheet of resistance paper 14. A pair of electrodes 16, 18 have been painted on the paper with conductive paint, to represent a pair of electrodes in a device. In the device, represented on the paper 14, one electrode has a different electrical potential then the other, giving rise to a field of unknown shape. An analog of the device is created by constructing the sheet with electrodes, as shown, and by establishing a voltage difference between the electrodes. In FIG. 1, an electric battery 20 is shown which has a 10-volt output, and whose terminals are connected between the electrodes 16, 18 to establish a 10-volt potential difference. The line 12 being drawn is of 1-volt potential. If the actual device provides a difference of 100,000 volts between corresponding electrodes, then the line 12 then represents a line of 10,000 volts in electric field. The electrodes in the device may be further or closer together, but their size and spacing must be proportional to the electrodes of the actual device.

The plotter 10 is constructed to enable automatic drawings of the equipotential line 12, so that that line and others like it can be drawn rapidly and accurately. The plotter includes a pen point 22 whose tip contacts the resistance paper to carry ink to it that forms the line 12. The pen is driven in the horizontal or X-direction by an X-drive 24 and is driven in the vertical or Y-direction by a Y-drive 26. Each drive includes a separate motor, to drive the pen in one direction. Initially, the pen 22 is positioned at the left end of the resistance paper 14, and the X-drive 24 is set to move the pen 22 to the right at a constant rate.

In order to energize the Y-drive 26 so that it keeps the pen 22 on the equipotential line 12, the Y-drive is energized from a summing junction 28. One input 30 to the summing junction is connected to a source which provides the 1-volt potential which is the potential of the line 12 to be drawn. This 1-volt source is the wiper 34 of a voltage divider 32 that is connected to the battery 20. Another input 36 to the summing junction is connected directly to the pen 22. The pen 22 is constructed of conductive material such as copper, and is insulated from the rest of the plotter, so that its voltage is equal to the potential where its point contacts the resistance paper 14. The summing junction has an output 38 equal to the difference between the voltage on one input 30 and on the other input 36.

If the voltage at the pen 22 is less than 1 volt, the difference voltage on output 38 will be positive. This positive output will energize the Y-drive 26 to move the pen 22 up, so that it contacts points of successively higher voltages, until it reaches a point of 1 volt. When the pen 22 reaches a point on the resistance paper of 1-volt potential, there is no voltage on output 38 of the summing junction and the pen remains at a constant vertical level. If the pen 22 contacts a point on the resistance paper which is of more than 1-volt potential, then the output from the summing junction is negative and the Y-drive moves the pen down until it reaches a point of 1-volt potential. Thus, the position of pen 22 is constantly adjusted to keep it at a point on the resistance paper of 1-volt potential as it is moved from left to right across the paper. Additional lines of different potentials can be drawn by operating the X-drive to return the pen to the left-hand side of the paper, moving the wiper 34 of the voltage divider to establish the voltage of the new equipotential line to be drawn, and starting the X-drive again, to again move the pen across the paper. All of these equipotential lines can be drawn rapidly and with a minimum of effort, and they have a smooth and accurate shape.

Figure 2:
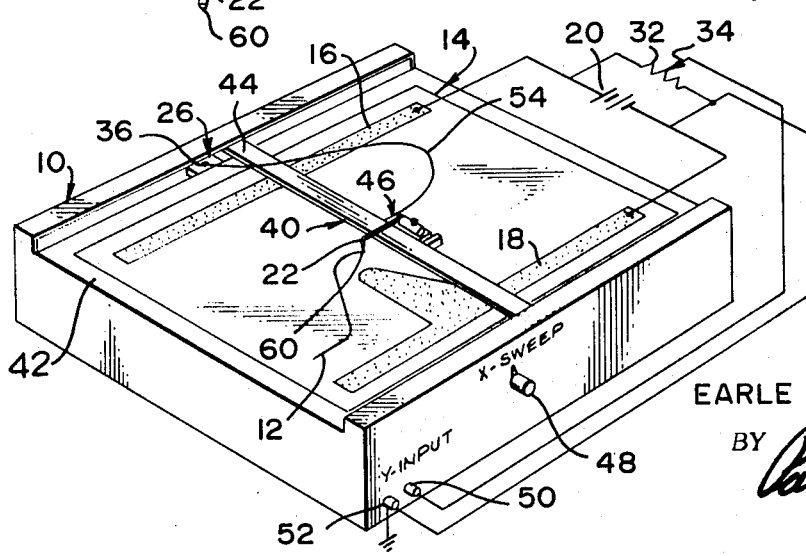
FIG. 2 is a perspective view of the plotter of FIG. 1.

FIG. 2 illustrates the plotter 10 showing how it may be constructed by making minor alterations in an ordinary X-Y-recorder such as model 7000A of the Hewlett Packard Company. The plotter, as it is commercially sold, has a Y-drive carriage 40 which can be moved left and right across a platen 42 which holds paper to be drawn upon. The drive carriage 40 includes a guide 44 which extends in the Y or vertical direction, and which guides a pen carriage 46. The pen carriage 46 and pen 22 which is mounted on it, can be driven along the guide 44 by a motor of the Y-drive 26 which is mounted at one end of the guide and which moves from left to right with it. The plotter 10 has an X-sweep dial 48 which can be set to cause automatic sweep of the Y-drive carriage 40 in the X-direction at any one of several rates. The plotter also has a Y-input terminal 50 which receives voltages that can cause the pen carriage 46 to move up or down along the guide 44. A ground terminal 52 is also provided.

In the usual use of the plotter 10, before adaptation to the drawing of equipotential lines in accordance with the invention, the pen carriage 46 follows the voltage at the Y-input 50. If this voltage is constant as the Y-drive carriage sweeps across the paper in the X-direction then the pen will draw a straight horizontal line. In order to make the pen carriage 46 follow the voltage at the input 50, the plotter 10 typically includes a slide wire. The slide wire is a long winding of resistance wire, and it is contacted by a wiper on the pen carriage 46, so that the resistance of the slide wire varies with the position of the pen carriage. The output of the slide wire before conversion, was connected to the point 36 which is the input 36 to the summing junction shown in FIG. 1. In order to convert the plotter to use for drawing equipotential lines, the slide wire is disconnected from terminal 36, and a wire 54 is connected between the pen 22 and the terminal 36. Then, the carriage 46 moves up or down until the potential of the pen 22 equals the potential at the Y-input 50 to the plotter. The derivation of the voltages for application to the electrodes 16, 18 and to the Y-input 50 is also shown in FIG. 2.

Figure 3:
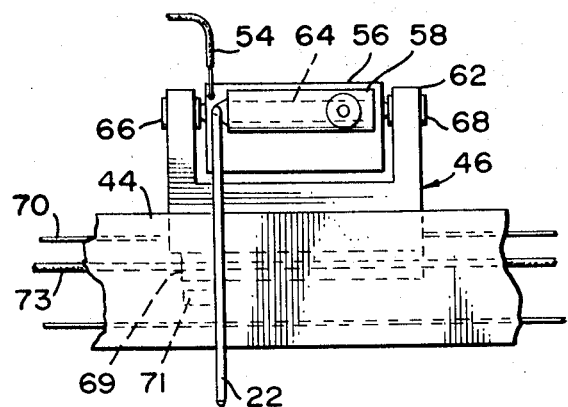
FIG. 3 is a plan view of the pen carriage of the plotter of FIG. 2.

FIG. 3 illustrates details of the pen carriage 46. The pen carriage includes a pen mount 56 which carries the pen 22 and an ink tube 58 which holds ink that is fed through the pen 22 to the point 60 of the pen that contacts the paper. The pen mount 56 is constructed of electrically conductive material, such as steel, and is in contact with the pen 22 which is also constructed of conductive material. The wire 54 which couples the pen mount 56 to the summing junction, is connected to a spot on the pen mount 56. The pen mount is pivotally mounted on a support 62 which moves along the guide 44. A shaft 64 fixed to the pen mount 56 pivotally supports the pen mount on a pair of bearings 66, 68 which are held by the support 62. The support 62 is attached to a cable 70 that extends around an idler pulley at the bottom of the guide and a drive pulley at the top of the guide that is driven by an electric motor energized by the output of the summing junction.

Generally, the bearings 66, 68 which pivotally support the pen mount 56 on the support 62, are constructed of a metallic material. In order to adapt the plotter for drawing equipotential lines, the pen mount 56 must be isolated from the rest of the mount, and particularly from contacts 69, 71 that contact the slide wire 73 and a ground connection. To isolate the pen mount, the bearings formerly positioned in the place of bearings 66, 68 are removed and nonmetallic bearings such as those constructed of a hard plastic are used.

Thus, the conversion of the plotter to use for equipotential plotting involves the breaking of the slide wire connection to the summing junction, the coupling of a wire from the pen 22 to the summing junction terminal from which the slide wire was disconnected, and the electrical isolation of the pen from the rest of the plotter. The wire 54 which couples the pen to the summing junction can be connected directly to the pen, or connected to the pen mount 56 or any other point which is electrically coupled to the pen. The isolation of the pen 22 from the rest of the plotter can be performed at any point. For example, the pen 22 can be isolated from the pen mount 56, or the support 62 can be isolated from the guide 40, and metallic bearings at the positions of bearings 66, 68 can then be used. Of course, the wire 54 must be connected to some point which is electrically coupled to the pen so that the wire 54 is coupled to the pen point.

Figure 4:
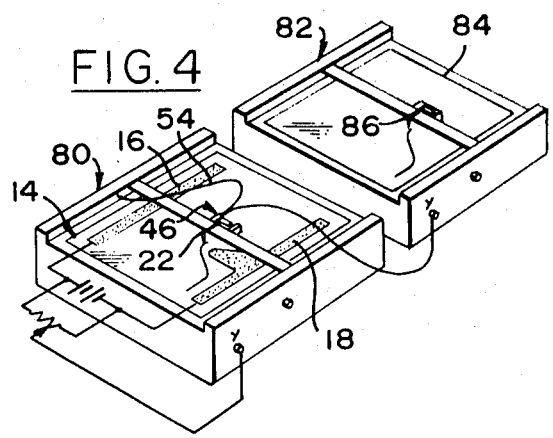
FIG. 4 is a perspective view of another embodiment of the invention.

The automatic plotting of equipotential lines can be performed in a number of different ways. FIG. 4 illustrates plotting apparatus which utilizes two plotters 80, 82 to enable the plotting of lines on an ordinary sheet of paper. One plotter 80 is set up identically with the plotter described above, including a sheet of resistance paper 14 and a pen carriage 46 modified to enable the drawing of equipotential lines on the sheet of resistance paper. However, the voltage on wire 54 is also coupled to the Y-input of the other plotter 82 which draws on a sheet of ordinary paper 84. Thus, the voltage on pen 22 of the first plotter drives the pen 86 of the second plotter and its pen draws a line which is identical to the line drawn on the sheet of resistance paper. In order to accurately couple the two plotters together, it is desirable to energize the X-drives of both plotters with the same voltage. This can be accomplished by operating the first plotter 80 in the automatic X-sweep mode, and connecting the internal X-driving voltage of the first plotter to the same point on the second plotter, to slave the second plotter to the first one.

It is also possible to use the automatic drawing method of the invention to make a three-dimensional plot for electrode configurations that vary in an irregular manner in three dimensions. Heretofore, an analog has been established by using a tank of water or other moderate resistance medium and placing electrodes to correspond to the electrode arrangement to be analogized. After voltages were coupled to each of the electrodes in an appropriate manner, a probe attached to a voltmeter was moved into the tank, and readings were taken at points which varied in position along the length, width, and depth of the tank. In order to automatically plot equipotential lines, the water tank analogy must also be established. A two-dimensional plotter can then be used wherein the point of a probe is located at a predetermined depth and is moved only along the length and width of the tank (only the point is exposed to the water). The probe potential can then be used to operate another plotter which draws on an ordinary sheet of paper, in the manner shown in FIG. 4. Groups of equipotential lines can be drawn at various depths in the tank to provide a plot of the potential variations in the tank. Another way of drawing equipotential lines in a three-dimensional situation, is to employ a plotting device which can move a probe in three directions simultaneously. The probe can emit ink which will show up as a line if the water bath or other medium is not turbulent, or if it is a highly viscous medium such as gelatin. Automatic plotting in three dimensions can be difficult in this situation since equipotential surfaces can exist, and in a complicated situation it may be difficult to keep the probe on an equipotential line.

Thus, the invention provides a method and apparatus for drawing equipotential lines. The method involves connecting a probe to a probe-driving system which keeps the probe on an equipotential line, and either drawing with the probe or slaving a plotter to the probe. An ordinary X-Y-plotter can be used with slight modifications to draw equipotential lines on resistance paper. The modifications are such that the plotter can be easily converted back to the original use (by disconnecting the pen wire 54 and reconnecting the slide wire).

Although particular embodiments of the invention have been described and illustrated herein, it is recognized that modifications and variations may readily occur to those skilled in the art and, consequently, it is intended that the claims be interpreted to cover such modifications and equivalents.

I claim:

1. A method for adapting an X-Y-plotter so that it can draw equipotential lines on a simulation setup that includes a sheet of resistance paper and that also includes a voltage source with first and second outputs at different potentials connected to spaced regions on the resistance paper and a third output of a potential between said first and second outputs, by merely laying the paper on the platen of the plotter and connecting the third output of the voltage source to a control terminal of the plotter, said plotter having a platen for holding paper, a first carriage for moving in a first direction across said platen, a second carriage for moving in a second direction perpendicular to said first direction along said first carriage, an electrically conductive pen mounted on said second carriage, motor means for driving said second carriage along said first carriage, summing junction means for driving said motor means, means coupled to a first input of said summing junction means for generating a voltage dependent upon the position of said second carriage along said first carriage, and a control terminal coupled to said second input of said summing junction means, comprising:

uncoupling said means for generating a voltage dependent upon the position of said second carriage from said first input of said summing junction means; and coupling said pen to said first input of said summing junction means.

2. The method described in claim 1 including:

placing a sheet of resistance paper having first and second conductive regions thereon, on said platen; and connecting first, second and third outputs of a voltage source wherein said third output has a potential in-between the potential at said fist and second outputs, respectively to said first conductive region of said paper, said second conductive region of said paper, and said control terminal of said plotter.

3. In apparatus for drawing an equipotential line of a predetermined third potential, on a sheet of resistance paper that has first and second locations thereon at first and second predetermined potentials, the improvement comprising:

a platen for holding a sheet of paper;

a first carriage mounted for movement in an ordinate direction across said platen;

a second carriage mounted on said first carriage for movement in first and second opposite directions which are both perpendicular to said ordinate direction;

a pen constructed of highly electrically conductive material mounted on said second carriage for movement with it;

means for insulating said pen from said platen;

a first motor for driving said first carriage;

a second motor for driving said second carriage;

summing junction means having an output coupled to said second motor, and having first and second inputs;

means electrically coupled to said first input of said summing junction means for carrying a voltage equal to said third predetermined potential thereto; and means for electrically coupling said pen to said second input of said summing junction means.

4. The improvement described in claim 3 including:

a pen mount of electrically conductive material for supporting said pen; and wherein said means for insulating said pen includes a pair of bearing members mounted on said second carriage for pivotally supporting said pen mount, said bearing members constructed of electrically insulative material.

5. In apparatus for drawing a line depicting an equipotential line on a sheet of resistance paper or the like which has first and second spaced locations, the improvement comprising:

first and second means coupled to first and second spaced locations on said resistance paper for establishing first and second potentials thereat;

third means for providing a predetermined potential which is between said first and second potentials;

a marking instrument with a point of electrically conductive material for contacting said paper and making a mark thereon where it contacts said paper;

means for moving said instrument in a first direction at a speed independent of the potential at said marking instrument;

electric motor means for moving said instrument in second and third opposite direction which are both substantially perpendicular to said first direction, in accordance with the polarity of an energizing input signal thereto; and means having a first input coupled to said marking instrument, a second input coupled to said third means, and an output coupled to said motor means, for generating a motor energizing signal of polarity dependent upon the difference between the potential at said marking instrument and said predetermined potential at said third means.

6. The improvement described in claim 10 wherein:

said instrument includes means defining a passageway leading to the region of said point; and said means for drawing a line comprises an ink container coupled to said passageway for supplying ink thereto, whereby to draw an ink line on said resistance paper.

* * * * *